(No Model.)

P. KOHL & H. PAULUS.
BOTTLE LABELING MACHINE.

No. 573,667. Patented Dec. 22, 1896.

5 Sheets—Sheet 1.

Witnesses
Alfred A. Nutley
Frank Wells

Inventors
Paul Kohl, and
Henry Paulus.
By their Attorneys
Keller & Storck

THE NORRIS PETERS CO., PHOTO-LITHO., WASHINGTON, D. C.

(No Model.)

P. KOHL & H. PAULUS.
BOTTLE LABELING MACHINE.

No. 573,667.

5 Sheets—Sheet 2.

Patented Dec. 22, 1896.

Witnesses
Alfred A. Mathey
Frank Wells

Inventors
Paul Kohl, and
Henry Paulus,
By their Attorneys,
Keller & Stacer (No Model.)  5 Sheets—Sheet 3.

P. KOHL & H. PAULUS.
BOTTLE LABELING MACHINE.

No. 573,667. Patented Dec. 22, 1896.

Witnesses
Alfred A. Mathey
Frank Wills

Inventors,
Paul Kohl, and
Henry Paulus,
By their Attorneys,
Keller & Starek (No Model.) 5 Sheets—Sheet 4.
P. KOHL & H. PAULUS.
BOTTLE LABELING MACHINE.
No. 573,667. Patented Dec. 22, 1896.
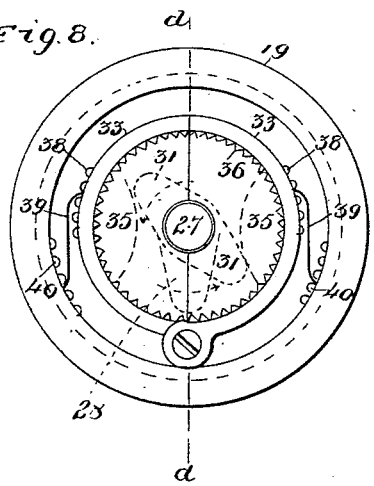
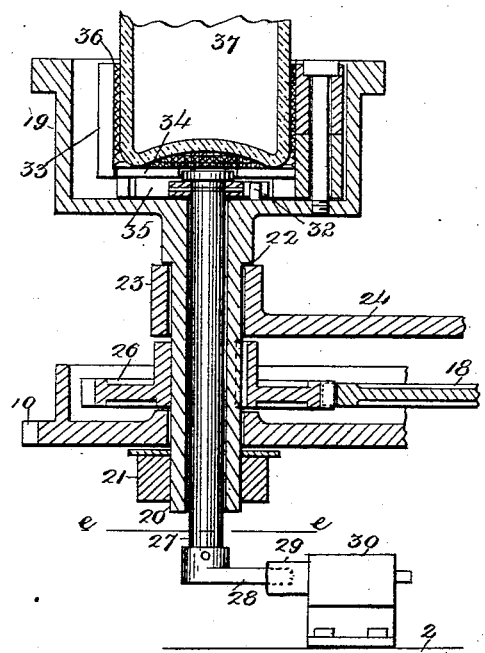
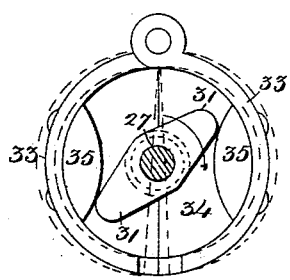
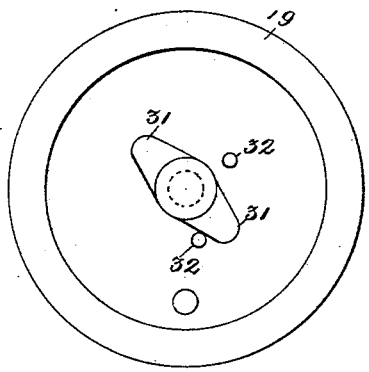
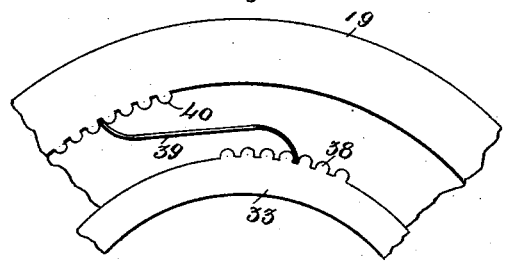
Witnesses
Alfred A. Mathey
Frank Wells
Inventors.
Paul Kohl, and
Henry Paulus.
By their Attorneys
Keller & Stare
THE NORRIS PETERS CO., PHOTO-LITHO., WASHINGTON, D. C.

(No Model.) 5 Sheets—Sheet 5.
P. KOHL & H. PAULUS.
BOTTLE LABELING MACHINE.
No. 573,667. Patented Dec. 22, 1896.
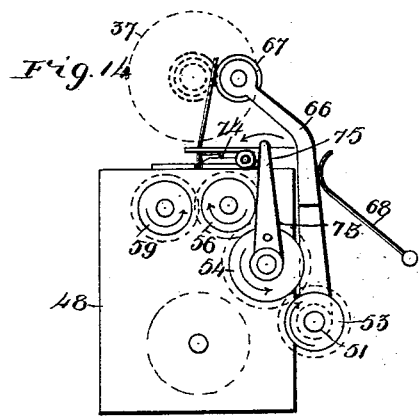
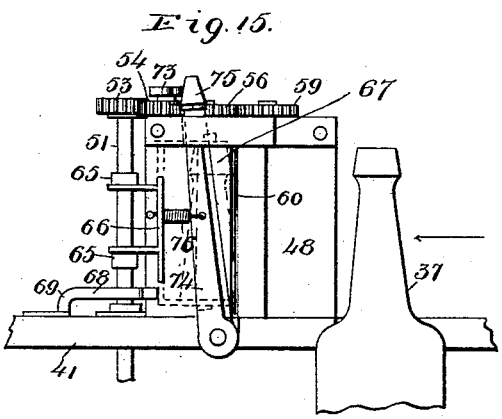
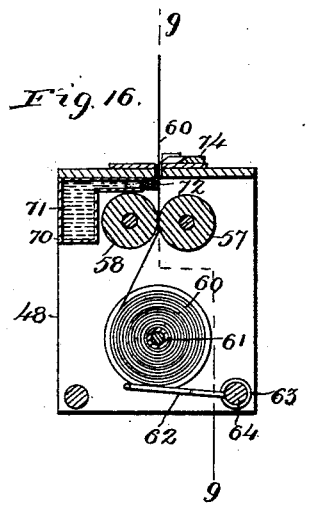
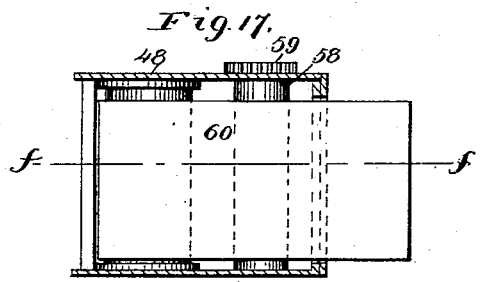
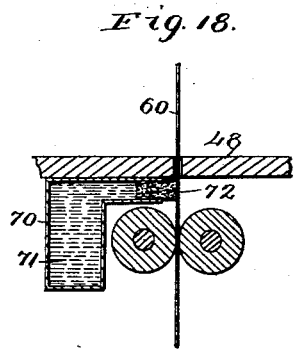
Witnesses
Alfred A. Mathey
Frank Wells
Inventors,
Paul Kohl, and
Henry Paulus.
By their Attorneys
Keller & Storer

UNITED STATES PATENT OFFICE.

PAUL KOHL AND HENRY PAULUS, OF ST. LOUIS, MISSOURI.

BOTTLE-LABELING MACHINE.

SPECIFICATION forming part of Letters Patent No. 573,667, dated December 22, 1896.

Application filed January 22, 1896. Serial No. 576,367. (No model.)

*To all whom it may concern:*

Be it known that we, PAUL KOHL and HENRY PAULUS, citizens of the United States, residing at St. Louis, and State of Missouri, have invented certain new and useful Improvements in Bottle-Labeling Machines, of which the following is a full, clear, and exact description, reference being had to the accompanying drawings, forming a part hereof.

Our invention has relation to improvements in machines for labeling bottles, cans, and similar vessels; and it consists in the novel arrangement and combination of parts more fully set forth in the specification and pointed out in the claims.

Figure 1:
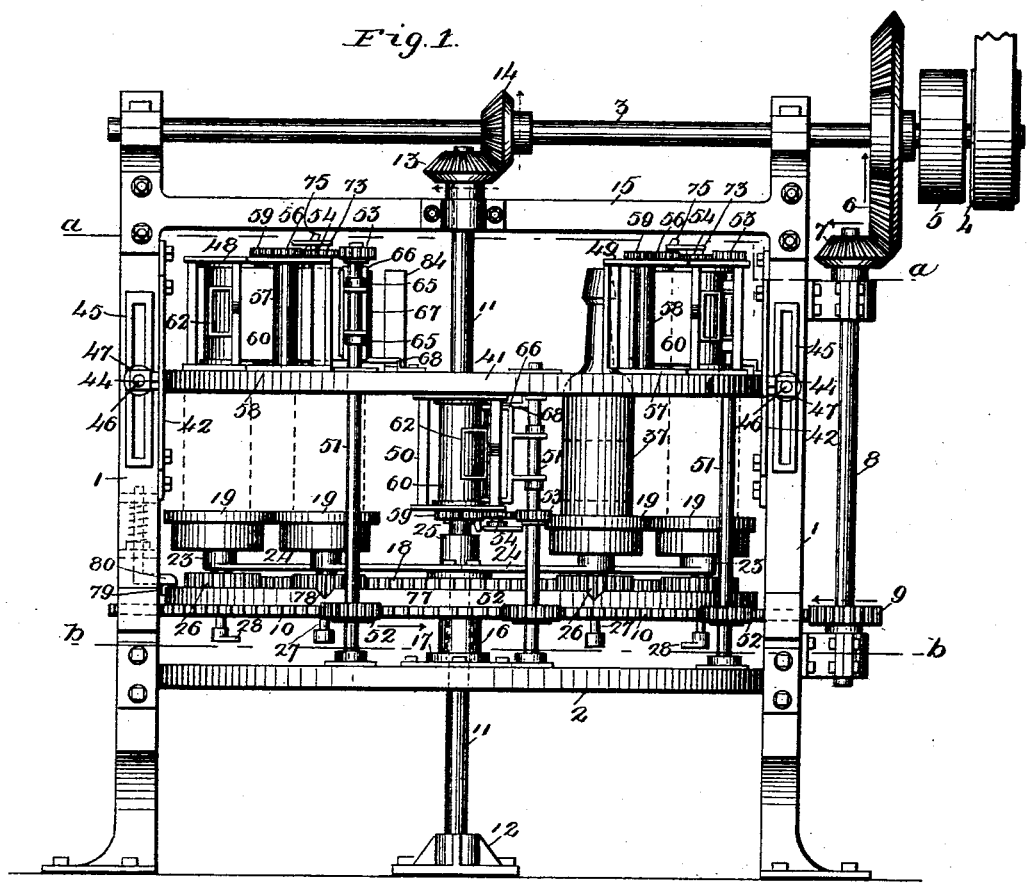
Figure 2:
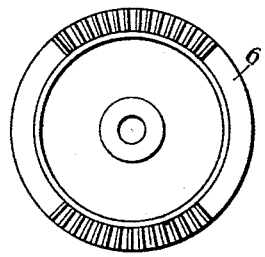
Figure 3:
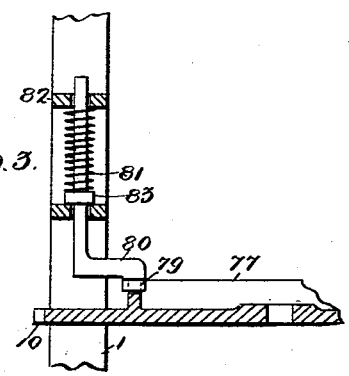
Figure 4:
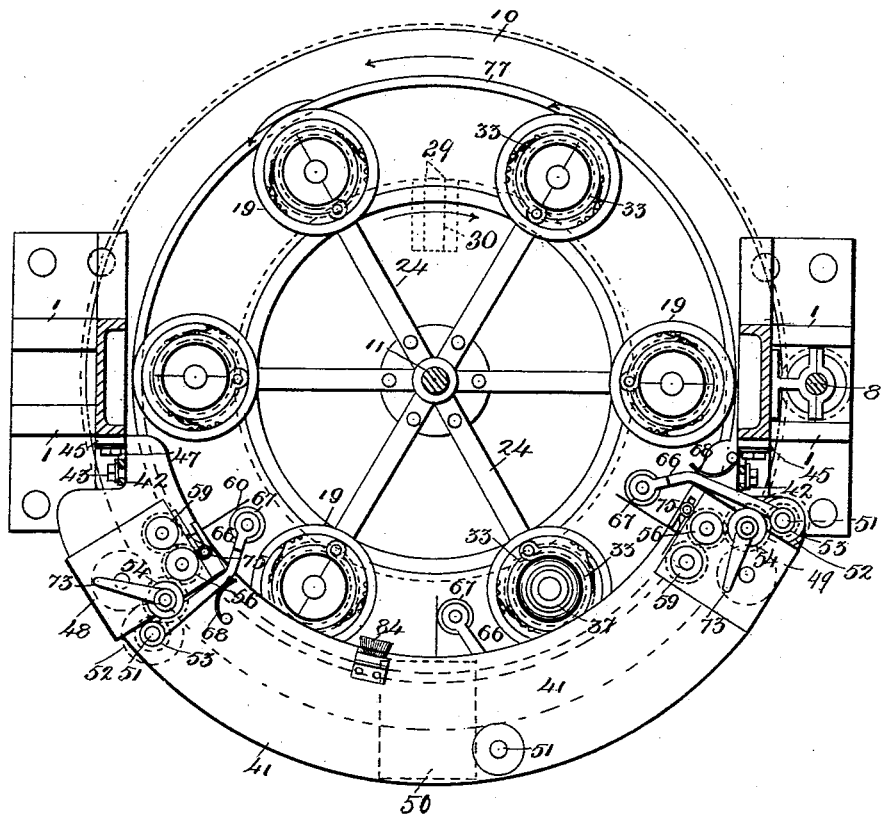
Figure 5:
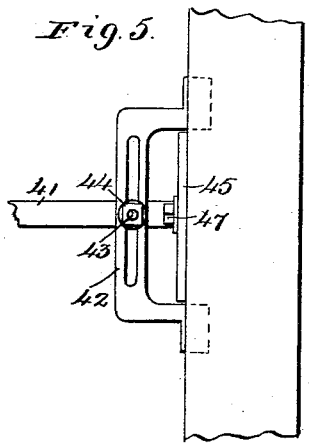
Figure 6:
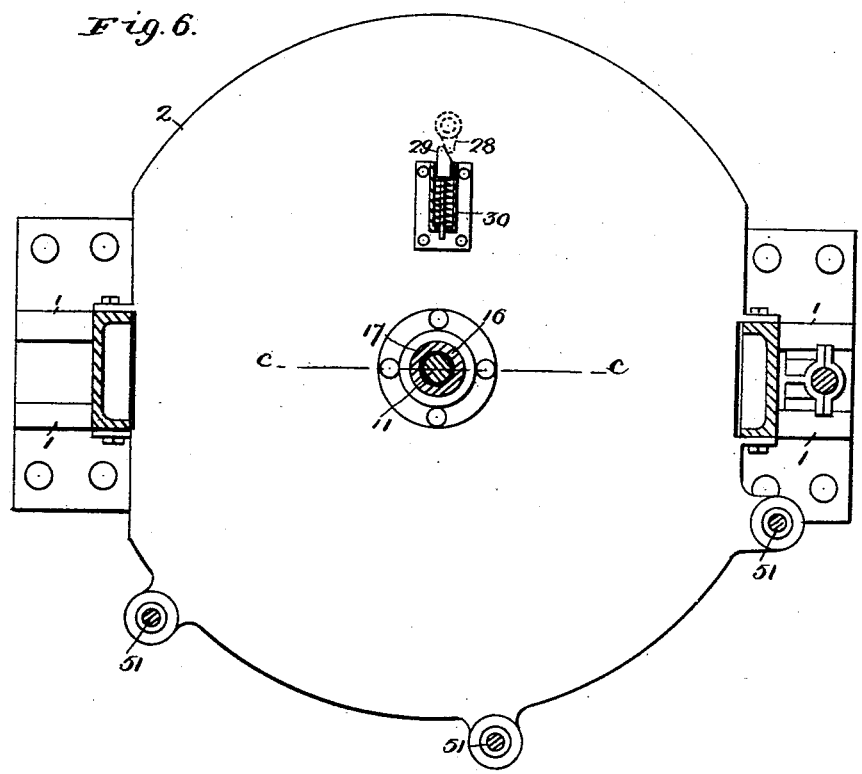
Figure 7:
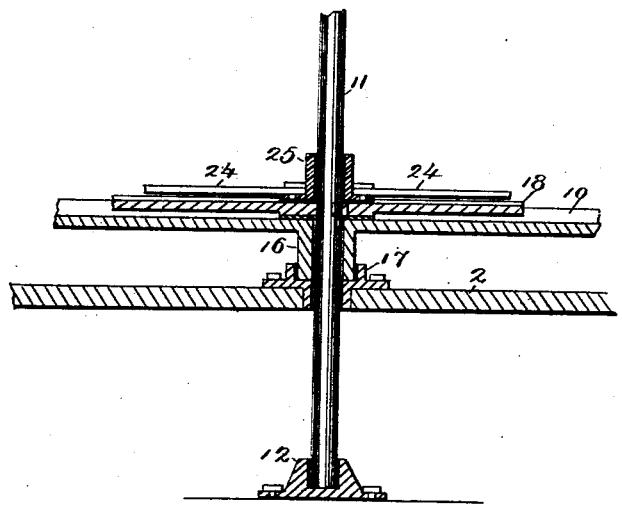

In the drawings, Figure 1 is a front elevation of our complete invention. Fig. 2 is a plan view of the partially-toothed bevel gear-wheel by which the bottle-advancing mechanism is intermittently driven. Fig. 3 is a sectional detail showing the spring-actuated locking-arm which arrests the momentum of the bottle-supporting gear-wheel, the section being taken through the plates in which the stem of the arm is guided. Fig. 4 is a section on $a$ $a$ of Fig. 1. Fig. 5 is a detail showing the slotted bracket along which the adjustable table carrying the label-boxes is secured. Fig. 6 is a section on $b$ $b$ of Fig. 1. Fig. 7 is a section on $c$ $c$ of Fig. 6. Fig. 8 is a top plan view of the bottle-holding cup. Fig. 9 is a section on $d$ $d$ of Fig. 8. Fig. 10 is a view of the under side of the bottom of the jaws mounted in the cup. Fig. 11 is a top plan view of the bottom of the cup with jaws removed. Fig. 12 is a section on $e$ $e$ of Fig. 9, showing the tripping-latch for the jaws. Fig. 13 is a detail plan showing a portion of cup and jaws with the spring for controlling the closing action of the jaws. Fig. 14 is a detail top plan of the label-supply box. Fig. 15 is a rear view thereof with portion of the controlling-arm for the label shown dotted, so as to better illustrate the cutting-knife in front of the same. Fig. 16 is a section on $f$ $f$ of Fig. 17, showing the inside of the label-supply box. Fig. 17 is a section on $g$ $g$ of Fig. 16; and Fig. 18 is a detail similar to Fig. 16, showing the mucilage-box and sponge on a larger scale.

The object of our invention is to construct a bottle-labeling machine which can be readily adjusted for labeling variable heights or sizes of bottles, the present construction, however, being most applicable for the labeling of beer-bottles, in which a sheet of foil is wrapped about the neck of the bottle, then a label pasted about the foil, and wherein a second label is wrapped about the body of the bottle.

A further object is to combine simplicity of construction with a maximum efficiency and produce a machine which will be uniform in its action and at the same time accurate.

To this end we have constructed a machine which in detail may be described as follows:

Referring to the drawings, 1 1 are the supporting-standards of the general frame of the machine, their basal portions being connected by a platform 2, above which are superposed the general operating parts of the labeling mechanism.

Supported in suitable bearings at the top of the standards 1 1 is a transverse driving-shaft 3, carrying at one end thereof and outside the frame the tight and loose pulleys 4 5, respectively, the said shaft having secured thereto adjacent to the pulley 5 a bevel gear-wheel 6, the driving-teeth of which are disposed along two diametrically opposite arcs of its periphery, the remaining arcs being devoid of teeth, or smooth. (See Fig. 2.)

With the intermittently-acting bevel gear-wheel 6 coöperates the pinion 7, carried at the upper end of a vertical shaft 8, mounted in suitable bearings on the outside of one pair of standards 1, the lower end of the shaft carrying a small gear-wheel 9, which meshes with the teeth of a bottle-supporting gear-wheel 10, superposed above the platform 2 and filling up the space between the supporting-standards 1. The said gear-wheel 10 loosely revolves about a central vertical shaft 11, having a bearing 12 on the floor below the platform 2 and passing centrally through the platform and carrying at its upper end a bevel-pinion 13, which meshes with a bevel-pinion 14, centrally disposed along the shaft 3, between the opposite pairs of standards 1 1, the upper end of the shaft 11 being, moreover, guided and braced by a transverse beam or brace 15, connecting the standards.

The gear-wheel 10 is supported by a hub or collar 16, which loosely embraces the shaft 11, said hub resting on a bearing-plate 17, carried by the platform 2 and through which the shaft 11 passes and serving to raise said gear-wheel 10 above the platform, as previously indicated. Keyed to the shaft 11 and located directly above the gear-wheel 10 is a gear-wheel 18 of smaller diameter than the gear-wheel 10. Upon motion being imparted to the shaft 3 in the direction indicated by arrows in Fig. 1 the gear-wheel 10 (loosely embracing, as it does, the shaft 11) will be driven in one direction, while the gear-wheel 18 (keyed to the shaft 11) will be driven in the opposite direction.

It has been stated that the diameter of the gear-wheel 18 is less than that of the gear-wheel 10, so that between the periphery of the two wheels is an annular space on the gear-wheel 10, along which are mounted a series of bottle-holding devices or cups 19, (see Fig. 9,) each adapted to hold a bottle in a vertical position and each provided with a hollow supporting-stem 20, which passes through the body of the gear-wheel 10, a nut 21 serving to prevent the displacement of the stem from the opening in the gear-wheel in one direction. Each stem is, moreover, provided with an annular shoulder 22, adapted to rest upon the terminal embracing loop 23 of an arm 24, which forms one of a series of arms radiating from a collar 25, loosely embracing the shaft 11, (see Figs. 4 and 7,) each arm 24 serving as an additional support and brace for the hollow stem 20 of each cup.

Carried by the stem 20 is a pinion 26, (see Fig. 9,) which meshes with the teeth of the gear-wheel 18. We have seen that as the gear-wheel 10 (which supports and carries the series of cups 19) revolves in one direction the gear-wheel 18 revolves in the opposite direction, so that the latter, meshing, as it does, with the pinion 26, carried by the hollow stem of the cup, will revolve each cup about its axis in a direction indicated in Fig. 4, that is to say, as the cups are carried around or advanced by the gear-wheel 10 in the direction indicated they will revolve about their own axes in the same direction. Passed through and carried by the hollow stem or axis of each cup is a rod 27, the lower end of which carries a toe 28, the rod revolving with the stem upon the rotation of the cup. As the cups are carried around and while rotating on their axes the toe 28 of each rod strikes the projecting bevel end of a spring-actuated latch 29, mounted in a boxing 30 in the rear of the platform 2, thereby oscillating or rocking the rod 27 within its hollow stem with each contact with the latch.

The upper end of each rod 27 carries the arms 31 31, which limit the degree to which the rod 27 is thus oscillated or rocked by striking one of the pins 32 32, projecting upward from the bottom of the cup, (see Fig. 11,) the other pin arresting the arm upon its return to its original or normal position, as subsequently to be explained, and serving, as it bears against one of the arms 31, to rotate the rod and its toe with the cup.

Pivoted or hinged adjacent to the vertical wall of each cup 19 are the semicylindrical jaws 33, with the lower surfaces of the bottoms 34 of which are formed the raised ears or curved ridges 35, the inner surfaces of the vertical walls of the jaws being provided with a ridged rubber sheet or fabric 36, adapted to embrace the lower portion of the bottle 37. (See Fig. 9.) As the rod 27 is rocked in the manner previously indicated the arms 31 simultaneously ride over the curved edges of the ears 35, thereby opening the jaws sufficiently to permit the ready insertion into or withdrawal from the jaws of the bottle to be labeled. (See Fig. 10.) This opening of the jaws pivoted in the cups occurs in the rear of the machine, where the operator is stationed to insert the unlabeled bottles and withdraw those that have the labels attached, as subsequently explained.

As just stated, the jaws are opened by the tripping action of the latch against the toe 28. The tripping takes place by reason of the advancing motion of the carrier 10 and during the continuous axial rotation of the cup at a time immediately preceding the instant that the carrier is momentarily at rest during the interval that the label is being glued to any one of the series of bottles mounted on the carrier, and when the labeling of any particular bottle is completed the carrier again begins to advance, thus moving the revolving toe out of a position for again contacting with the latch 29. The speed of the parts is so related that the forward bodily motion of the stem 27 and its toe with the advancing carrier 10 is in excess of the speed of rotation of the toe about the axis of the stem, whereby the toe is brought into striking contact with the bevel side of the latch before the rotation of the stem about its own axis has had time to remove the toe from said bevel side. The latch 29 is made bevel to permit the toe to ride smoothly thereover, and the object of the spring 30 is to allow the latch to yield should the toe for any reason be out of order or bind and fail to revolve with the cup.

Of course it becomes necessary that the jaws immediately close over the bottle the moment the latter is inserted into the cup. This is accomplished as follows: The outer wall of each jaw is fluted or ribbed vertically, the depressions between the ribs 38 being adapted to receive one end of a yielding bent spring-plate 39, whose opposite end is received in one of a corresponding series of depressions formed between corresponding ribs 40 along the inner surface of the vertical wall of the cup. The tension of the spring-plate 39 is adjusted by properly setting its free ends in the depressions made for their reception. The bottle being once inserted, and the moment the action of the tripping-latch has once ceased, (that is, the moment the toe 28 has been carried beyond the action of the tripping-latch,) the spring-plates 39 close the jaws firmly against the walls of the bottle inserted between them.

The general direction of travel of each bottle having been explained, we will now describe the labeling device from which the sheets on which the labels are printed are fed and the manner of securing the labels to the bottles. Adjustable vertically along the standards 1 1, and located between the standards on the side which for convenience may be termed the "front" of the machine, is a table or shelf 41, the manner of said adjustment being best indicated in Figs. 1 and 5. One of the standards 1 on each side of the machine is provided with a slotted bracket 42, through the slot of which passes a stem 43, provided with a tightening-nut 44.

When the table has been properly adjusted, the nut 44 is tightened, thus clamping the table firmly to the bracket 42. The end of the table is further provided with a slotted plate 45, which moves with the table and bears against the front of the standard 1, a suitable stem 46, carried by the standard, passing through the slot and capped by a tightening-nut 47, which also serves to secure the table in place after once being adjusted. At each end and on top of the table 41 are mounted the label-supply boxes 48 49, respectively, the former box supplying the tin-foil strip which is generally wound about the neck of beer-bottles and the latter supplying the strip which furnishes the labels generally pasted over the foil. Intermediate the boxes 48 49, but mounted or secured to the under side of the table 41, is a box 50, which supplies the label that is generally wrapped about the body portion of the bottle. As the labeling devices of each box are the same we will describe but one, such description sufficing for all.

Referring particularly to Figs. 1 and 4 and 14 to 18, inclusive, the construction of the labeling devices may be described as follows: Properly disposed and mounted along the platform 2 are a series of vertical shafts 51, whose lower end each carries a pinion 52, meshing with the gear-wheel 10. The upper end of each shaft carries a pinion or gear 53, the direction of whose rotation during the action of the machine is relatively indicated in Fig. 14. The gear 53 meshes with a gear 54, mounted on a suitable stud on top of the label-box 48, 49, or 50, the gear 54 in turn driving the gear 56 at the end of one of a pair of feed rollers or cylinders 57 58, the said gear 56 meshing with a gear 59 at the end of the cylinder 58 to insure proper direction of rotation for the feed-cylinders. The roll of foil or label-paper 60 is mounted on a spindle 61, disposed parallel to the axes of the feed-rollers 58 58, a spring or elastic-hinged frame or arm 62 bearing with its free end or edge against the roll, that the latter may always unwind under a constant tension. The hinge 63 of said frame is carried by one of the vertical posts 64, located at one of the corners of the box.

Loosely embracing the shaft 51 and held between the collars 65 65, disposed along the same, is a bent arm or lever 66, carrying at its free end a roller 67 of a contour conforming in outline to the particular portion of the bottle to be labeled, (be it the neck or body portion of the bottle,) against the periphery of which roller the sheet of labels as they are fed from the roll may come in contact, the arm 66 being kept in its normal position by the free end of a flexed spring-arm 68, secured at one end to the top of the table 41. The arm has a right-angled deflected portion 69, about which it may be bent to any necessary degree about what may be termed the "pivotal point" of said arm. Placed in a receptacle 70 at one corner of any box and adjacent to the feed-cylinders is suitable liquid adhesive 71, which finds its way through the pores of a sponge 72 or other equivalent brush adapted to smear or brush a suitable quantity of the adhesive on that side of the advancing sheet of label which is to come in contact with the bottle approaching the sheet, as best seen by the arrows in Fig. 4. The free or advancing edge of the label-sheet becomes thus interposed between the roller 67 and the bottle, and the momemt the mucilaged side of the sheet comes in contact with the bottle the rotation of the latter wraps the sheet around it.

Of course it becomes necessary that the advancing sheet shall be cut off into proper lengths, so that only one wrap of the sheet shall be attached to the bottle. This is accomplished as follows: To the upper surface of the gear 54 is secured an arm 73, (see Fig. 14,) the free end of which as it revolves with the shaft strikes the upper end of a knife-blade 74, pivoted along the base of the rear side of the box, the friction between the parts being reduced by the antifriction-roller 75, mounted at the free end of said knife-blade. The parts are so proportioned that the knife chops off just enough of the sheet to go around the particular part of the bottle to be labeled and the mechanism so timed that the chopping off of the sheet may take place at the proper moment, the blade being retracted for the next stroke by a spring 76, having one end secured to the knife and the other end to any convenient part of the box. Of course as the labeling of the bottle is taking place (the bottle all this time revolving about its axis in the direction previously indicated) the gear-wheel 10, which carries the bottle, must remain stationary long enough to allow the label to wrap around the bottle, further feeding of the sheet being discontinued for the time being. This temporary or momentary cessation in the rotation of the gear-wheel 10, which advances the series of bottles, takes place as the smooth portion of the intermittent gear-wheel 6 deprives the shaft 8 of its motion, and to insure that the momentum of said gear-wheel 10 may not carry it beyond the exact position at which it is desirable that it should stop we form on said wheel a circular ledge 77, surrounding the pinions 26, along which ledge are disposed or formed a series of bevel-notches 78, with which the corresponding bevel end 79 of a spring-actuated locking-arm 80, mounted between the standards 1 1 on one side of the machine, may engage at the proper moment, thus stopping the gear-wheel 10 positively, the smooth space on the bevel gear-wheel 6 being of proper proportion to insure the stopping of the travel of the bottle until the labeling operation is completed.

As best seen from Fig. 3, a spring 81, coiled about the stem of the locking-arm 80 and having one end interposed between the upper guide-plate 82 and the other against a collar 83, serves as the means for effecting engagement between the locking-arm and the notches disposed along the ledge 77. The number of notches corresponds to the number of cups which carry the bottles. As the toothed portion of the bevel gear-wheel 6 resumes the rotation of the shaft 8, and thus advances the gear-wheel 10 a distance sufficient to reach the next succeeding label-box, the bottle, now firmly held between the jaws of the cup carrying it, will overcome the resiliency of the spring 68, brushing aside, as it were, the arm 66 sufficiently to enable the bottle to pass to the next succeeding label-box, whereupon a similar series of operations takes place. The box 48, which supplies the tin-foil, need not necessarily be provided with mucilage or adhesive, since the foil wrapped around the neck will adhere to the bottle until the mucilaged label emerging from the box 49 can be wrapped and pasted over it. The box 50, mounted under the table 41, labels the main or body portion of the bottle. Where foil is used, the latter is generally brushed close to the neck of the bottle by coming in contact with a brush 84 after it leaves the box 48, (see Fig. 4,) by which operation the foil is made to better hug the bottle before the label issuing from the box 49 is wrapped around it. The object of making the table adjustable is to enable the operator to label bottles of variable heights, it being remembered too that different bottles have different-sized body portions as well as different lengths of neck.

The operator is stationed diametrically opposite the table 41 in the rear of the machine, the parts and gearing being so proportioned that the jaws carried by the cups are opened by the tripping-latch 29 at the proper moment to enable the free and easy insertion of the bottle to take place, after which the jaws, under the action of the springs 39, close firmly about the bottle. The latter is then carried forward or advanced by the gear-wheel 10, at the same time being rotated about its own axis, revolving as it does with the cup driven by the gear 18 through the medium of the pinion 26. As each bottle comes in contact with the sheet passing along the roller 67 (or its equivalent in each box) the wheel 10 is made to stop, the bottle all the time revolving on its axis and wrapping the label-sheet about its neck or body portion, as the case may be. The bottle or cup which carries it revolves constantly under the action of the shaft 3, which rotates at a uniform speed. When any particular label is wrapped around the bottle, the latter is advanced to the next succeeding labeling-box, and so on until the operation is complete.

Although we have shown six cups and three labeling-boxes, it is apparent that any number may be used and any number (one or more) of labels attached, and when the operation is complete each bottle is released by the opening of the jaws, as previously indicated, the operator during the opening of the jaws quickly removing the labeled bottle and inserting a fresh bottle before the jaws have had time to close.

The machine of course is applicable to the labeling of bottles, cans, and similar vessels.

Having described our invention, what we claim is—

1. In a bottle-labeling machine, a suitable frame, a series of label devices disposed about the frame, suitable devices for holding the bottles in proper position, means for intermittently advancing the holding devices and feeding the bottles carried thereby to the labeling devices, means for imparting constant axial rotation to each bottle, and means for checking the advance of each bottle from the beginning of, until the completion of the labeling operation, and continuing the advance of each bottle upon the completion of the labeling operation, substantially as set forth.

2. In a bottle-labeling machine, a suitable frame, a series of traveling cups mounted therein for receiving and holding the bottles, suitable devices for advancing the series of cups, means for imparting constant axial rotation to the cups and bottles carried thereby, means for temporarily stopping the advance of the cups during the axial rotation of the same, and suitable labeling devices for wrapping the labels about each bottle during the stopping of the advance movement of the cups, substantially as set forth.

3. In a bottle-labeling machine, a suitable frame, a main drive-shaft mounted therein, a shaft coöperating with said drive-shaft and adapted to be constantly rotated thereby, a gear-wheel keyed to said second shaft, a bottle-carrying gear-wheel loosely embracing said second shaft and adapted to be intermittently advanced by the main drive-shaft, labeling devices adapted to be operated by said bottle-carrying gear-wheel, and suitable cups for holding the bottles carried by the bottle-carrying wheel, and adapted to be constantly rotated axially by the gear-wheel keyed to said second shaft, substantially as set forth.

4. In a bottle-labeling machine, a suitable frame, a transverse drive-shaft mounted thereon, a vertical shaft adapted to be constantly rotated thereby in one direction, a gear-wheel carried by said shaft, a second gear-wheel of larger diameter located below the first gear-wheel and loosely embracing the vertical shaft, a hub forming a part of said larger gear-wheel, a supporting-platform for said hub, an intermittent gear-wheel carried by the main drive-shaft and adapted to impart intermittent rotation to the large gear-wheel in a direction opposite to the smaller gear-wheel, a series of cups carried by the larger gear-wheel exterior to the periphery of the smaller gear, pinions carried by the cups adapted to coöperate with the teeth of the smaller gear-wheel whereby the cups are constantly rotated about their axes in a direction corresponding to the direction of advance of the gear-wheel carrying the cups, and suitable labeling devices operated from the gear-wheel carrying the cups, substantially as set forth.

5. In a bottle-labeling machine, a suitable intermittently-advancing gear-wheel, a series of cups mounted adjacent to the periphery thereof, a hollow stem for each cup, a nut carried by the stem on one side of the gear-wheel for preventing displacement of the stem in one direction, a pinion carried by each stem, a gear-wheel for driving said pinion and thus rotating the stem, a series of arms having looped ends adapted to support the several cups above the gear-wheel in which the cups are mounted, said arms radiating and loosely embracing a shaft to which the gear-wheel driving the pinions carried by the stems is keyed, a rod passing through the stem of each cup and projecting below the lower end of the stem, a toe at the end of each rod, a tripping-latch adapted to trip each toe during the advance of the gear-wheel carrying the cups, suitable pivoted jaws carried by each cup, means secured to the upper end of each rod for opening said jaws upon the tripping or rocking of the rod, and suitable devices for closing the jaws after the tripping effect of the latch has ceased, substantially as set forth.

6. In a bottle-labeling machine, a suitable cup, a hollow stem for the same, a rod passed through said stem, means for tripping and rocking said rod, arms carried at the upper end of the rod and resting on the bottom of the cup, limiting-pins on said bottom against which the arms may strike, pivoted jaws in the cup, raised ears having curved edges at the bottom of each jaw, said arms adapted upon the tripping of the rod to ride over said ears and open the jaws, and yielding springs adapted to be adjustably interposed between the inner surface of the wall of the cup and the outer wall of each jaw for closing the jaws, substantially as set forth.

7. In a bottle-labeling machine, a suitable label-supply box, a shaft mounted adjacent thereto adapted to be rotated intermittently in one direction a gear carried at the upper end of the shaft, a stud mounted in the box and having a gear coöperating with the gear on the first-named shaft, an arm secured to the gear mounted on the stud and adapted to rotate therewith, suitable feed-rollers mounted in the box and having gears meshing with each other and coöperating with the gear carrying the arm, a supply reel or spindle for the sheet-labels, means for rubbing adhesive on the sheet after the same has passed the feed-rollers, a knife pivoted to the frame of the machine and adapted to be struck by the revolving arm for chopping the sheet into required lengths, a spring for retracting the knife-blade to its normal position, a controlling-arm loosely embracing the intermittently-rotating shaft, a roller at the free end of the arm conforming to the shape of the part of the bottle to be labeled, means for intermittently advancing the bottles to the gummed side of the sheet, additional means for revolving the bottle axially to cause the sheet confined between the bottle and the roller end of the controlling-arm to wrap about the bottle, and a yielding spring bearing against the controlling-arm whereby as the said arm is pushed aside during the further advance of the bottle, it may be restored to its normal position, substantially as set forth.

8. In a bottle-labeling machine, a suitable cup, a series of corrugations along the inner wall thereof, jaws pivoted within said cup, a series of corrugations along the outer surfaces of the jaws parallel with the corrugations formed on the cup, and a spring-plate adapted to have its opposite ends received by the depressions between the corrugations for closing the jaws, substantially as set forth.

In testimony whereof we affix our signatures in presence of two witnesses.

PAUL KOHL.
HENRY PAULUS.

Witnesses:
ALFRED A. MATHEY,
E. STAREK.